(12) United States Patent
Johnson

(10) Patent No.: US 7,320,520 B2
(45) Date of Patent: *Jan. 22, 2008

(54) PORTABLE MULTIMEDIA PROJECTION SYSTEM

(75) Inventor: Lonnie G. Johnson, Atlanta, GA (US)

(73) Assignee: Johnson Research and Development Co., Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/425,400

(22) Filed: Jun. 21, 2006

(65) Prior Publication Data

US 2006/0227291 A1 Oct. 12, 2006

Related U.S. Application Data

(63) Continuation of application No. PCT/US2004/034315, filed on Oct. 19, 2004.

(60) Provisional application No. 60/512,673, filed on Oct. 20, 2003.

(51) Int. Cl.
- G03B 21/14 (2006.01)
- G03B 21/22 (2006.01)
- G03B 31/00 (2006.01)
- H04N 5/64 (2006.01)
- A47B 81/06 (2006.01)
- H05K 5/00 (2006.01)

(52) U.S. Cl. ............ 353/15; 353/119; 353/122; 348/838; 181/198; 181/146

(58) Field of Classification Search ............ 353/119, 353/122, 15; 348/838; 181/198, 146
See application file for complete search history.

(56) References Cited

U.S. PATENT DOCUMENTS

| | | | |
|---|---|---|---|
| 5,214,514 | A | 5/1993 | Haberkern |
| 5,266,980 | A | 11/1993 | Gussin et al. |
| 5,461,437 | A | 10/1995 | Tanaka et al. |
| 5,630,659 | A | 5/1997 | Ronzani et al. |
| 5,664,859 | A | 9/1997 | Salerno et al. |
| 5,729,395 | A | 3/1998 | Tanaka |
| 5,847,748 | A | 12/1998 | Laughlin |
| 6,332,029 | B1 | 12/2001 | Azima et al. |
| 6,359,994 | B1 | 3/2002 | Markow et al. |

(Continued)

FOREIGN PATENT DOCUMENTS

EP 0 560 125 A1 2/1993

(Continued)

OTHER PUBLICATIONS

U.S. Appl. No. 90/008,007, dated Apr. 2006, Johnson.

(Continued)

*Primary Examiner*—Diane I. Lee
*Assistant Examiner*—Magda Cruz
(74) *Attorney, Agent, or Firm*—Akin Gump Strauss Hauer & Feld LLP

(57) ABSTRACT

A portable multimedia projection system includes a portable housing, a DVD player, a channel tuner, an image projection device, a controller and a remote control receiver. The image projection device externally projects images. The controller is electrically coupled to the channel tuner and the image projection device. The controller directs video signals from the channel tuner to the image projection device.

4 Claims, 13 Drawing Sheets

U.S. PATENT DOCUMENTS

| | | |
|---|---|---|
| 6,406,151 B1 | 6/2002 | Fujimori |
| 6,431,711 B1 | 8/2002 | Pinhanez |
| 6,443,574 B1 | 9/2002 | Howell et al. |
| 6,505,940 B1 | 1/2003 | Gotham et al. |
| 6,522,419 B1 | 2/2003 | Ko |
| 6,574,433 B1 | 6/2003 | Stuempfl |
| 6,623,123 B2 | 9/2003 | Eguchi et al. |
| 6,626,543 B2 | 9/2003 | Derryberry |
| 6,637,888 B1 | 10/2003 | Haven |
| 6,655,668 B1 | 12/2003 | Wakeen et al. |
| 6,776,490 B2 | 8/2004 | Soper et al. |
| 6,785,217 B1 | 8/2004 | Kao et al. |
| 6,904,154 B2 | 6/2005 | Azima et al. |
| 6,966,651 B2 * | 11/2005 | Johnson ............... 353/15 |
| 7,039,210 B2 | 5/2006 | Holland |
| 2002/0105624 A1 | 8/2002 | Quori |
| 2002/0149672 A1 | 10/2002 | Clapp et al. |
| 2002/0175915 A1 | 11/2002 | Lichtfuss |
| 2004/0017548 A1 * | 1/2004 | Denmeade ............... 353/31 |
| 2004/0189873 A1 | 9/2004 | Konig et al. |
| 2005/0012909 A1 * | 1/2005 | Kokin et al. ............. 353/119 |

FOREIGN PATENT DOCUMENTS

| | | |
|---|---|---|
| WO | 03/079678 A1 | 9/2003 |

OTHER PUBLICATIONS

Best Buy's Description of Panasonic 27" Diagonal TV/DVD Player Combo (www.bestbuy.com, Oct. 22, 2002).

* cited by examiner

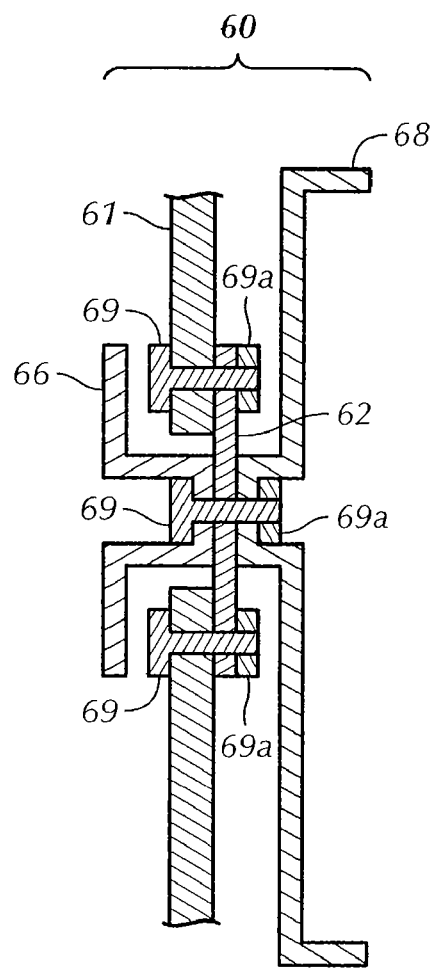
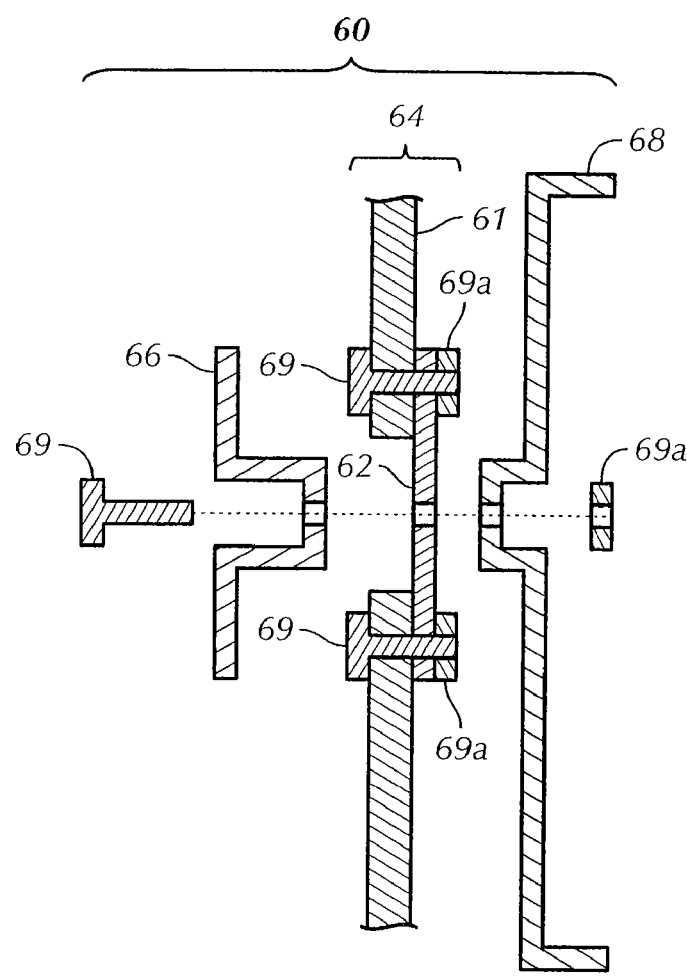
*FIG. 12A*  *FIG. 12B*

PORTABLE MULTIMEDIA PROJECTION SYSTEM

CROSS-REFERENCE TO RELATED APPLICATIONS

This application is a continuation of co-pending International PCT Patent Application No. PCT/US2004/034315, filed Oct. 19, 2004, entitled "Portable Multimedia Projection System."

This application claims the benefit of U.S. Provisional Patent Application No. 60/512,673, filed Oct. 20, 2003, entitled "Portable Multimedia Projection System."

BACKGROUND OF THE INVENTION

The present invention relates generally to a multimedia projector and, more particularly, to a portable multimedia projection system having a vibration dampening or suppression device.

In the past projection systems have been based on high intensity cathode ray tube (CRT) technology. Like conventional TVs, CRT projectors have smaller CRT tubes built into them. These tubes are small (perhaps 9-inch diagonal), expensive and extremely bright. In a basic layout, there are typically one or more CRT tubes that form the images. A lens in front of the CRT magnifies the image and projects it onto the screen. CRT devices do not have the fine resolution that LCD devices do, especially when projected. There are three CRT configurations used in CRT projectors:

one color CRT tube (red, blue, green phosphors) displays an image with one projection lens;

one black-and-white CRT with a rapidly rotating color filter wheel (red, green, blue filters) is placed between the CRT tube and the projection lens. The rapid succession of color images projected onto the screen forms an apparently single color image (the images are projected too quickly for your brain to distinguish between them); and three CRT tubes (red, green, blue) with three lenses project the images. The lenses are aligned so that a single color image appears on the screen. One of the problems with conventional CRT projectors is that, with anywhere from one to three tubes and accompanying lenses and/or a filter wheel built in, the projectors can be quite heavy and large.

One projection system disclosed in U.S. Pat. No. 6,626,543 ("Derryberry") possibly suggests integrating a laptop and a projector, so there may be the hint that the laptop has an internal speaker. However, there is no real explanation of how an internal speaker, especially an amplified speaker or sound system, might be installed so as not to negatively impact upon the projection device.

Another projection system disclosed in U.S. Patent Application Publication No. 2004/0017548 A1 ("Denmeade"), the contents of which are incorporated by reference herein, includes a combination of a digital media source, such as, a computer hard drive, digital (video) disc player (DVD), and/or Compact Disc (CD) format; integral with a microprocessor; an image projection device, such as, a Liquid Crystal Display (LCD) or Digital Light Processors (DLP); a set of controls; and audio components to provide a stand alone system for use as a toy projection system, business projection system, or home projection system. As noted in the Denmeade publication, the two dominant digital projection technologies are LCD and DLP. LCD projectors use small transmissive LCD displays to project digital images. Digital projectors typically function by projecting white light from a light source, the light is split into the three primary colors (i.e., red, green, and blue—RGB), light for each color is then projected through a grayscale LCD display that allows the appropriate portion of light for the desired image to pass through and the filtered colors are then optically recombined and projected for display. The system is enclosed in a singular housing and is shown with one or two speakers integral therewith. In some embodiments, the image projection device can be rotated within the housing or via mirrors to project images on vertical and horizontal surfaces, such as, walls, screens, ceilings, and desktop rear projection screens. However, what is absent in the Denmeade publication is a teaching for using such a projection system with an integral, amplified sound system so that vibration can be curtailed to avoid shaking or disturbing the projection. Furthermore, the projection system in the Denmeade publication is lacking additional functionality such as wireless input/output (I/O) for receiving data from a network or communicating with wireless speakers as well as other I/O which might enhance the possible applications of such a projection system.

Without special consideration in designing structural supports, vibrations generated by the audio component would be coupled through the stabilizing mass to the sensors included in the system for interpreting audio visual information. This is particularly true for laser sensor based audio CD and DVD media information systems. In the past, portable CD and DVD systems have included internal vibration suppression systems because of an inherent need to sustain vibrations during mobile operations. On the other hand, fixed rear projection televisions include a video projector in combination with an audio system. However, these systems have the inherently large stabilizing mass of the CRT type projectors used in these systems and the heavy cabinet of the TV itself such that the need for additional, separate integrated vibration stabilization of the projection component is less significant.

It is desirable to provide a portable multimedia projection system having an internal sound system and a vibration dampening or suppression device. Further, it is desirable to provide a portable multimedia projection system having an internal sound system and a vibration dampening or suppression device along with wireless inputs and/or outputs. Even, further, it is desirable to provide a portable multimedia projection system having an internal sound system and a vibration dampening or suppression device along with a plurality of connectivity options such as component video, Ethernet, wireless I/O, radio frequency (RF) receiving for radio and television, S-video, cable, parallel, serial, universal serial bus (USB) and the like.

BRIEF SUMMARY OF THE INVENTION

Briefly stated, the present invention comprises a portable multimedia projection system including a portable housing, a channel tuner supported by the portable housing and a controller disposed within the housing. The image projection device externally project images relative to the portable housing. The controller is electrically coupled to the channel tuner and the image projection device. The controller directs video signals from the channel tuner to the image projection device.

The present invention comprises a portable multimedia projection system including a portable housing, a channel tuner supported by the housing, a digital video disc/digital versatile disc (DVD) player supported by the housing, a digital projector disposed at least partially within the housing, an amplified sound system being disposed at least partially within the housing and a controller disposed within the housing. The DVD player outputs audio visual data signals corresponding to data read from a DVD. The image projection device externally projects images relative to the portable housing. The amplified sound system includes a subwoofer. The controller is electrically coupled to the channel tuner, the amplified sound system and the digital projector. The controller selectively directs audio signals from the DVD player or the channel tuner to the amplified sound system and selectively directs video signals from the DVD player or the channel tuner to the digital projector.

The present invention also comprises a portable multimedia projection system including a portable housing, a channel tuner supported by the portable housing, a digital projector disposed at least partially within the housing, an amplified sound system being disposed at least partially within the housing and a controller disposed within the housing. The digital projector externally projects images relative to the portable housing. The projector is one of a liquid crystal display (LCD) and digital light processing (DLP). The amplified sound system includes outputs for at least two speakers and a subwoofer. The controller is electrically coupled to the channel tuner, the amplified sound system and the digital projector. The controller directs audio signals from the channel tuner to the amplified sound system and directs video signals from the channel tuner to the digital projector.

The present invention also comprises a portable multimedia projection system including a portable housing, a channel tuner supported by the portable housing, a digital projector disposed at least partially within the housing, an amplified sound system being disposed at least partially within the housing and a controller disposed within the housing. The digital projector externally projects images relative to the portable housing. The projector is one of a liquid crystal display (LCD) and digital light processing (DLP). The amplified sound system includes a subwoofer and outputs for at least two speakers. The controller is electrically coupled to the channel tuner, the amplified sound system and the digital projector. The controller directs audio signals from the channel tuner to the amplified sound system and directs video signals from the channel tuner to the digital projector.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 12A is an assembled side view of one mounting dampening mounting bracket for use with the preferred embodiments of the present invention;

FIG. 12B is an exploded side view of the mounting dampening mounting bracket of FIG. 12A;

DETAILED DESCRIPTION OF THE INVENTION

Figure 1:
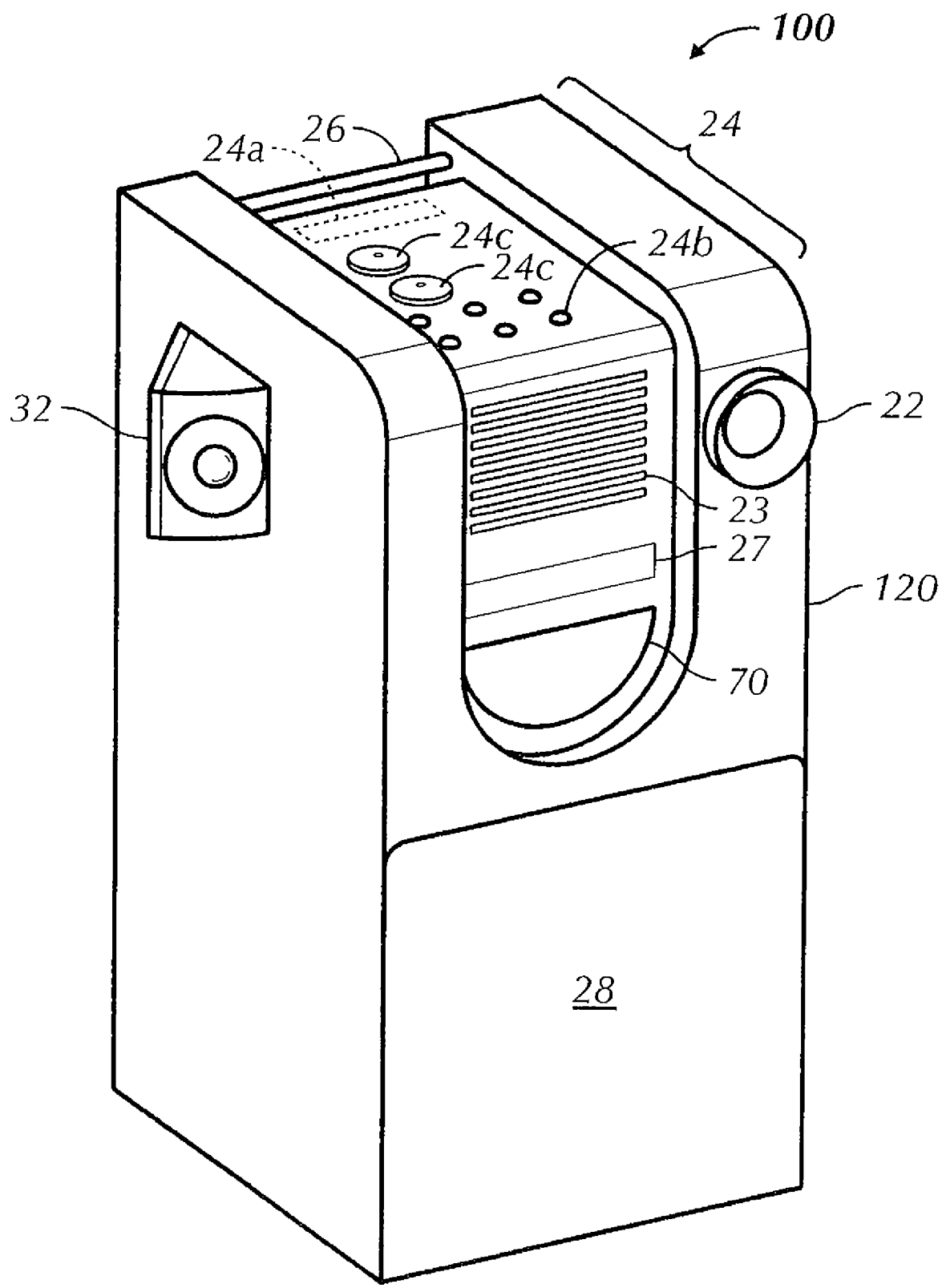
FIG. 1 is a perspective view of a portable multimedia projection system in accordance with a first preferred embodiment of the present invention.

Certain terminology is used in the following description for convenience only and is not limiting. The words "right," and "left," "lower," and "upper" designate directions in the drawings to which reference is made. The words "inwardly" and "outwardly" refer to directions toward and away from, respectively, the geometric center of the object discussed and designated parts thereof. The terminology includes the words above specifically mentioned, derivatives thereof and words of similar import. Additionally, the word "a" is used in the claims and in the corresponding portions of the Specification, means "at least one."

"DVD" once was the abbreviation for Digital Video Disc and later became Digital Versatile Disc but now "DVD" is just DVD, and really is no longer an acronym that it once was. As used herein "DVD" is an optical disc format for storing video, audio and/or data. It should be noted that a DVD disc may contain any combination of DVD-Video, DVD-Audio, and/or DVD-ROM application content. DVDs currently come in a variety of formats as the desire to increase storage capacity continues. For example, DVD-5 is the simplest format having a capacity about 4.7 Gigabytes (GBytes) of digital data, DVD-9 has a capacity of about 8.5 GBytes by using a second layer such that a player must automatically switch to the second layer and DVD-10 has a capacity of about 9.4 GBytes of data by storing data on both sides of the disc and requiring a user or the player to physically flip the DVD (the DVD-10 is sometimes called the "flipper" disc). Of course, any and all of these formats as well as other improved versions are suitable for use with the present invention.

Figure 4:
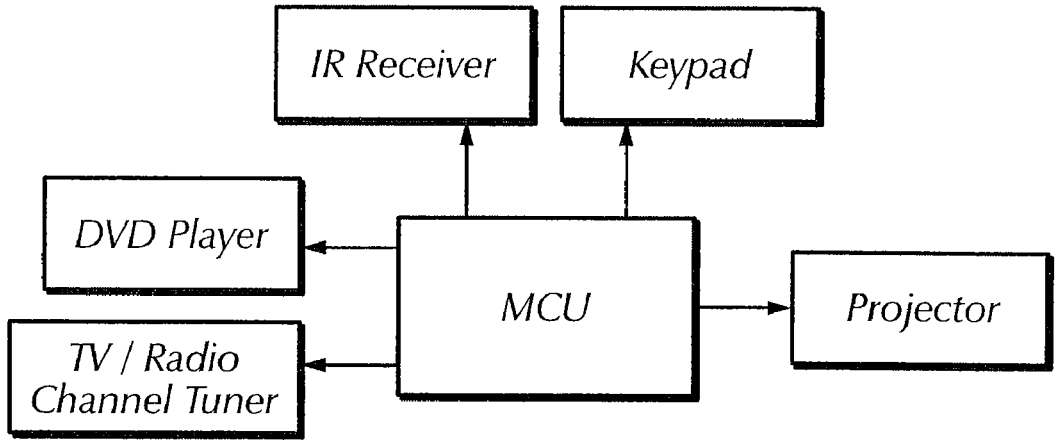
FIG. 4 is a general block diagram showing major components of a portable multimedia projection system in accordance with the preferred embodiments of the present invention.
Figure 5:
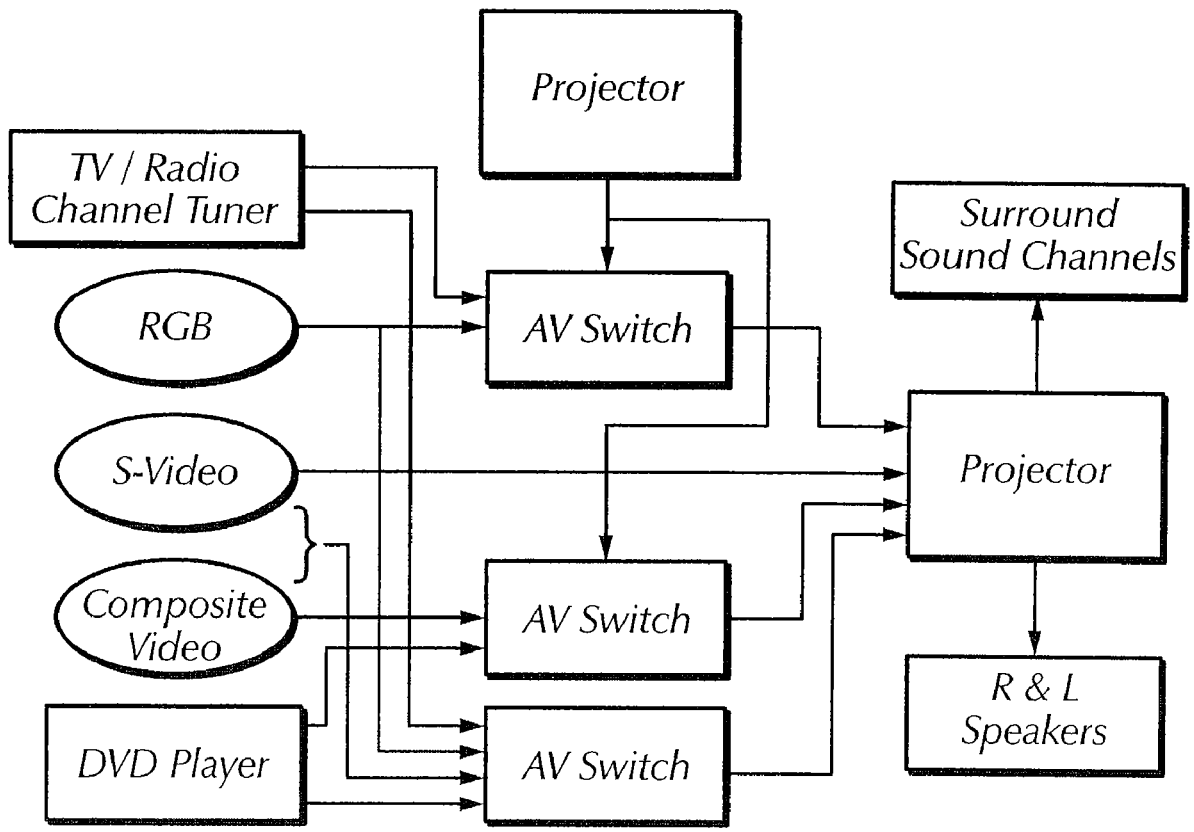
FIG. 5 is a schematic signal input/output (I/O) diagram for a portable multimedia projection system in accordance with the preferred embodiments of the present invention.
Figure 6:
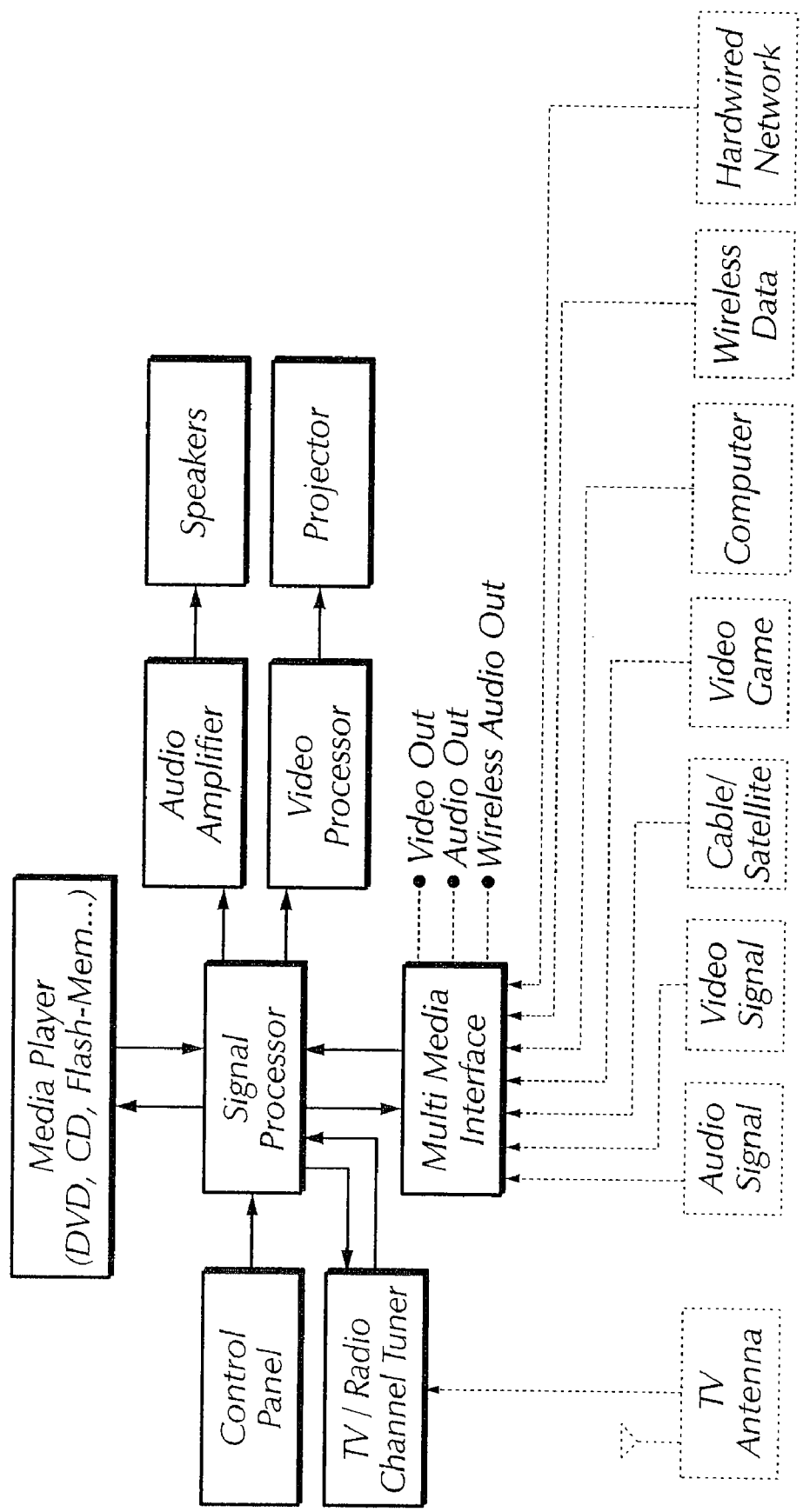
FIG. 6 is a detailed schematic diagram of a portable multimedia projection system in accordance with the preferred embodiments of the present invention.

In the drawings, like numerals are used to indicate like elements throughout. Referring to the drawings in detail, FIG. 1 shows a portable multimedia projection system 100 in accordance with a first preferred embodiment of the present invention. The portable multimedia projection system 100 is a complete multimedia system that integrates units (see FIGS. 4 and 6) such as a media player 27 (e.g., DVD player, CD player, flash memory reader, etc.), an image projection device or projector 22, a television (TV) and/or radio channel tuner 70, a projector 22, and a sound system 32/34/36 having two speakers 32, 34 and a subwoofer 36 (i.e., a "2.1 channel" system where "2" represents the speakers and "0.1" represents the subwoofer). The portable multimedia projection system 100 processes video signals from various sources of VGA input, TV/radio channel tuner 70, media player 27 (e.g., DVD player), video input, component video input and S-video input and transmits output video signals to the projector unit 22, thus projected onto an external screen or wall (not shown) with a configured video quality (see FIGS. 5 and 14B). The portable multimedia projection system 100 also processes audio signals from various sources of VGA input, TV/radio channel tuner 70, media player 27 and video input and transmits audio signals via the projector unit to the 2.1 channel sound system 32/34/36 with speakers/subwoofer unit 32, 34, 36. The portable multimedia projection system 100 includes a local control panel 24 having buttons 24b and knobs 24c for controlling features and functions of the portable multimedia projection system 100. Optionally, control panel 24 includes a display 24a such as a liquid crystal display (LCD) for displaying setting and status information and/or providing soft menus.

The TV/radio channel tuner 70 preferably includes an AM/FM radio receiver and a TV receiver and is configured to provide channel tuning thereof. The TV/radio channel tuner 70 may also include cable and satellite tuning for a plurality of channels. Optionally, the TV/radio channel tuner 70 can receive World Band radio signals.

The projector 22 is configurable for 800×600 resolution for a 4:3 aspect ratio and/or 800/1024/1280×450/576/720 for a 16:9 aspect ratio. The projector 22 includes an optical zoom lens and has scan rates for high definition television (HDTV) and SVGA and VGA compatibility. Recent advances in Digital logic Processing (DLP) and Liquid Crystal Display (LCD) video projector technology contribute to improving the output and reducing the overall size and weight of the portable multimedia projection system 100. The portable multimedia projection system 100, 200, 300, 400 is preferably based on DLP and LCD technology which significantly reduces the size and weight requirements of the projection system 22. However, as used herein, projector 22 shall be used as general terminology to describe a broad range of digital projection technologies including LCD and DLP, as well as improved digital projection technology.

The media player 27 is preferably a DVD player, but the media player 27 may be a DVD player, a CD player, a CD read only memory (ROM) player, a flash memory device such as a flash random access memory (flash-RAM) drive, a tape player, a DVD player/recorder, a CD player/recorder, a CD-ROM player/recorder, a tape player/recorder, a record album turntable, a hard disk drive and the like. The media player 27 may alternatively be a simple port such as a USB port that accepts a USB flash memory device (i.e., a USB memory key). The media player 27 may also be other memory devices capable of storing multimedia data such as slideshows, movies, videos, pictures and the like. While shown with one media player 27, the portable multimedia projection system 100 may also include a plurality of media players 27 that are the same or different. For example, there may be a DVD player and a CD player/recorder and/or a flash memory reader; or the may be a DVD player and a DVD player/recorder. Other combinations of media players 27 may also be utilized. Preferably, the portable multimedia projection system 100 includes at least a DVD player.

The 2.1 channel sound system is preferably amplified to provide a theater quality feel. Preferably, the output power is on the order of 660 watts peak momentary performance output (PMPO). Preferably, the subwoofer 36 receives a 5 watt root mean square (RMS) signal and each of the speakers 32, 34 receives a 2.4 watt RMS signal.

While shown as a 2.1 channel amplified sound system 32/34/36, the sound system 32/34/36 may include even more channels such as left rear, right rear, center, right front, and left front. For example, it may be desirable to set up the portable multimedia projection systems 100, 200, 300, 400 (FIGS. 1-3 and 13) in a surround sound configuration such as a Dolby 5.1 channel system commercially available from Dolby Laboratories, Inc., New York, N.Y. A Dolby 5.1 channel system has six channels including five full-range channels (i.e., left rear, right rear, center, right front, and left front) and a low-frequency effects channel (i.e., the "0.1" of the "5.1") usually expressed through a subwoofer 36. At least one channel (i.e., left rear, right rear, center, right front, and left front, and low-frequency effects) is provided by at least one internal speaker 32, 34, 36. Preferably, at least the subwoofer 36 is internally mounted in the portable housing 120, 220, 320, 420. A control interface panel (FIG. 14B) provides outputs for the surround sound channels and/or wirelessly transmits wireless audio data for speakers having wireless receivers. Other surround sound configurations may also be utilized with the portable multimedia projection systems 100, 200, 300, 400, such as Dolby 6.1/7.1 also commercially available from Dolby Laboratories, may include six (with center back) or seven (with left back/right back) full-range channels.

Figure 2:
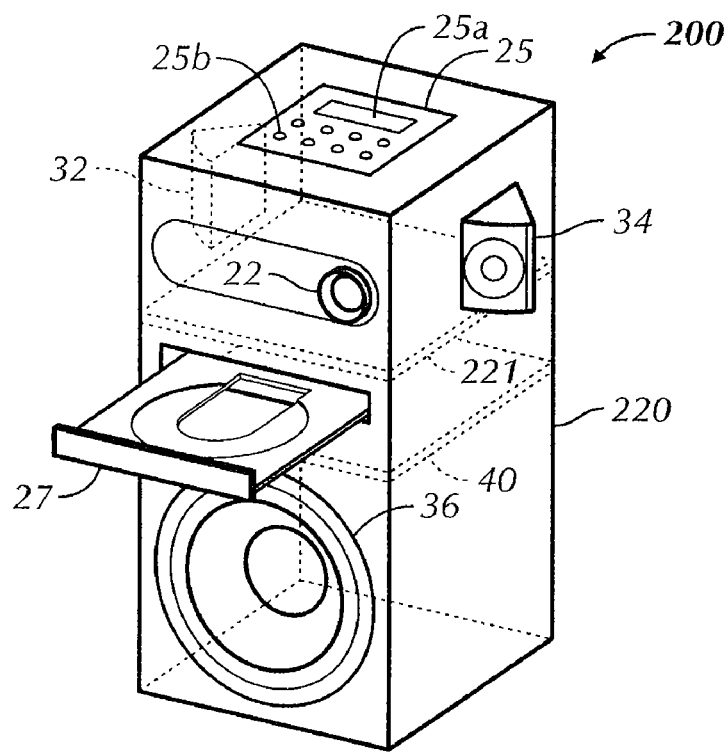
FIG. 2 is a perspective view of a portable multimedia projection system in accordance with a second preferred embodiment of the present invention.

FIG. 2 shows a portable multimedia projection system 200 in accordance with a second preferred embodiment of the present invention. The portable multimedia projection system 200 is substantially similar to the portable multimedia projection system 100 but includes a different local control panel 25 having a local display 25a and buttons 25b. The subwoofer 36 is pictured facing forward, but the subwoofer may also be facing rearward and there may be subwoofer output cone 37 (FIG. 11) opposite thereto in the housing 220 of the portable multimedia projection system 200.

Figure 3:
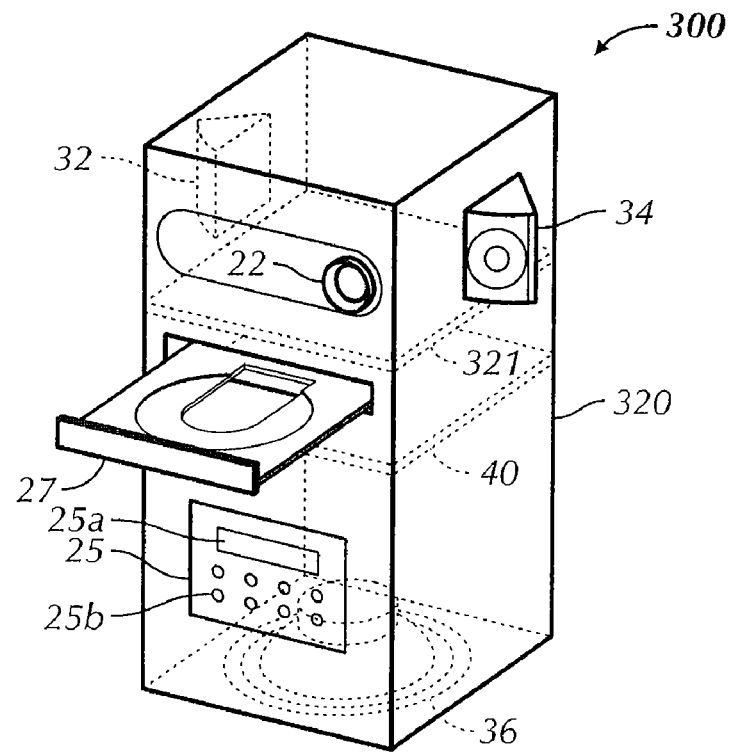
FIG. 3 is a perspective view of a portable multimedia projection system in accordance with a third preferred embodiment of the present invention.

FIG. 3 shows a portable multimedia projection system 300 in accordance with a third preferred embodiment of the present invention. The portable multimedia projection system 300 is substantially similar to the portable multimedia projection system 200, but the subwoofer 36 is pictured facing downward.

Figure 13:
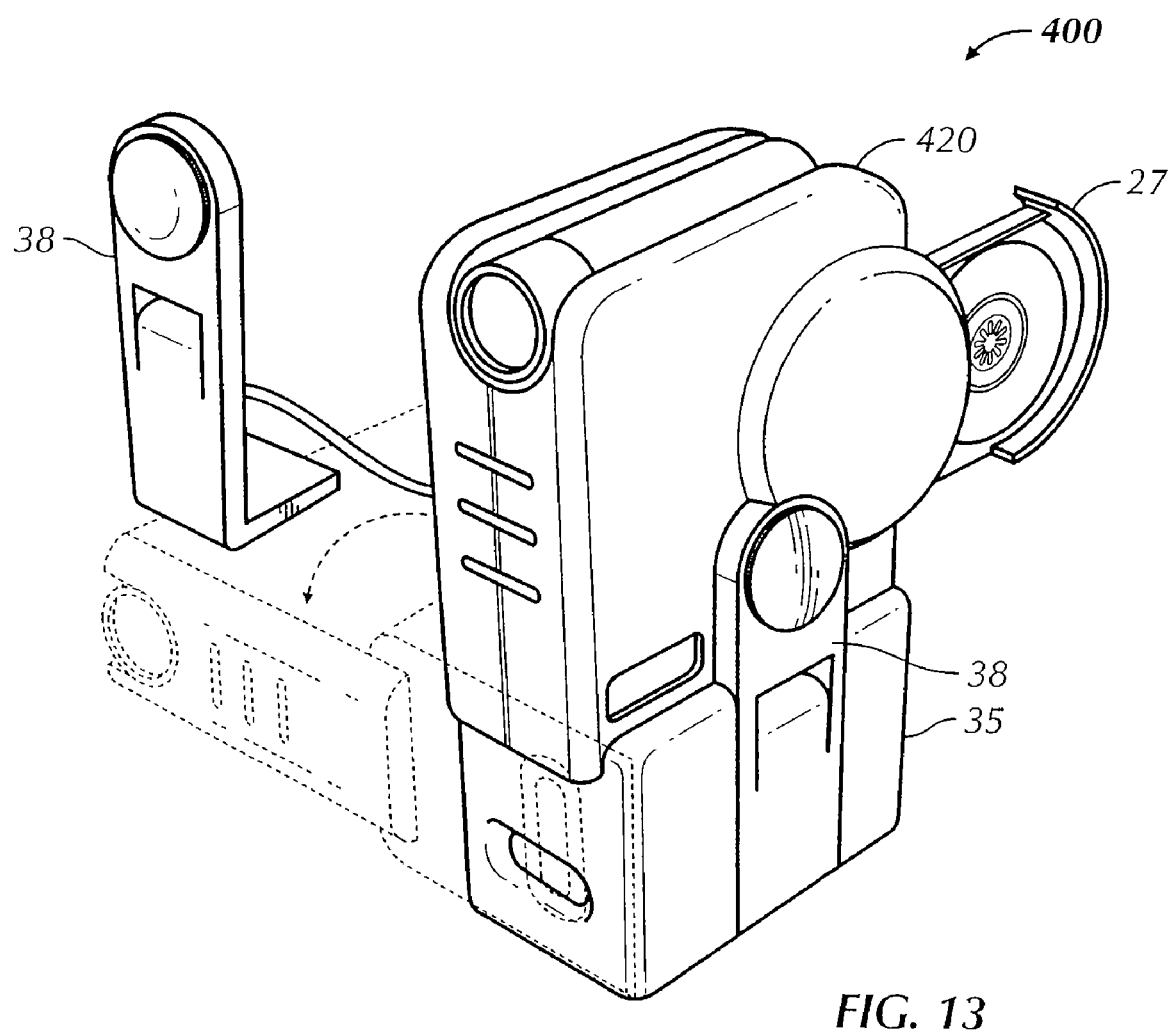
FIG. 13 is a perspective view of a portable multimedia projection system in accordance with a fourth preferred embodiment of the present invention.

FIG. 13 shows a portable multimedia projection system 400 in accordance with a fourth preferred embodiment of the present invention. The portable multimedia projection system 400 includes many of the components of the portable multimedia projection system 100, but the portable multimedia projection system 400 is selectively reconfigurable to be used in a vertical orientation (solid line) or in a horizontal orientation (phantom line). The portable multimedia projection system 400 is configured to electronically rotate the orientation of the projection output (i.e., remapping the video output data in software) by selecting a "rotate horizontal/rotate vertical" or "rotate 90°" button or menu selection. Alternatively, the portable multimedia projection system 400 contains an orientation sensor (not shown) which automatically electronically rotates the projection output to the correct orientation based upon the detected orientation (i.e., vertical or horizontal). Alternatively, the user may be required to physically rotate the projector about 90° or projector lens by about 90°. The portable multimedia projection system 400 further includes detachable satellite speakers 38, in addition to the internal speakers 32, 34, 36. The detachable satellite speakers 38 may include extensible speaker wires or may alternatively include wireless receivers for receiving wireless audio data from the portable multimedia projection system 400 main unit. Thus, the portable multimedia projection system 400 can be set up, even temporarily, in a surround sound configuration to enhance the multimedia experience. Furthermore, portable multimedia projection system 400 has a sleek minimalist housing design.

All of the portable multimedia projection systems 100, 200, 300, 400 can be configured with detachable satellite speakers 38 that include extensible speaker wires or wireless receivers for receiving wireless audio data from the portable multimedia projection system main unit 100, 200, 300, 400. Some sort of clip/locking mechanism is provided to allow these detachable satellite speakers 38 to be attached to the main housing 120, 220, 320, 420 for carrying around from place to place, but also allow them to be "dismounted" once the unit is set in place and ready to play a movie or TV show, or MP3, etc. This allows the surround sound configuration of a home theater for temporary portable use via the appropriate placement of the speakers 38 in a room.

To improve its practical utility, the portable multimedia projection system 100, 200, 300, 400 includes a vibration dampening and isolation system 50, 60 for making the audio visual components compatible for location into a single, small, light weight, portable unit. The vibration dampening and isolation system 50, 60 provides physical linkage and for structural support between audio, video and media sensor platforms. The need for such a "linkage" system 50, 60 is driven by the need to eliminate the vibration impacts that the audio component, i.e., the speaker or speakers 32/34/36, has on the visual component, i.e., the projector 22 and the media player component(s) 27, e.g., CD/DVD player. Without special consideration in designing structural supports, vibrations generated by the audio component would be coupled through the stabilizing mass to the sensors included in the system for interpreting audio visual information. This is particularly true for laser sensor based audio/video CD and DVD media information systems. In the past, portable CD and DVD systems have included internal vibration suppression systems between their portable housing and the disk spinning table because of an inherent need to sustain vibrations during mobile operations. On the other hand, fixed rear projection televisions include a video projector in combination with an audio system. However, these systems have the inherently large stabilizing mass of the CRT type projectors used in these systems and the heavy cabinet of the TV itself such that the need for additional, separate integrated vibration stabilization of the projection component is less significant.

In order to create the desired high quality sound in a small portable package, a relatively high power speaker system 32/34/36 is used, as mentioned above. The inclusion of the projector 22 in the same housing 120, 220, 320, 420 as parts of such a relatively high power speaker system 32/34/36 that has high power, deep base, quality sound in a relatively small portable projection system housing 120, 220, 320, 420 creates a need for vibration isolation. In this application the only stabilizing mass available is significantly smaller than that available in large fixed large rear projection TVs. Vibration isolation and dampening is therefore important for the portable multimedia projection system 100, 200, 300, 400.

Figure 10:
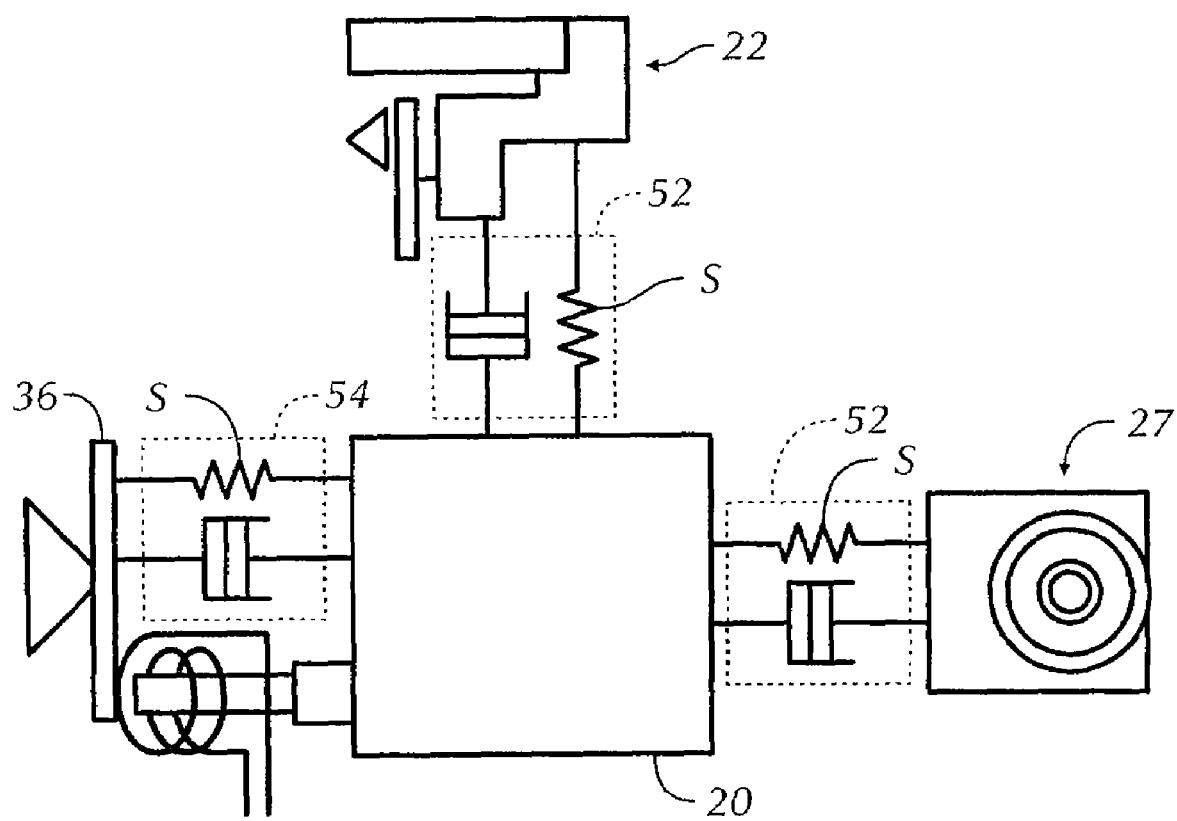
FIG. 10 schematically represents a vibration dampening and suppression system in accordance with the preferred embodiments of the present invention.

FIG. 10 schematically represents a vibration dampening and suppression system 50 in accordance with the preferred embodiments of the present invention. As illustrated schematically in FIG. 10, the portable multimedia projection system (100, 200, 300, 400) includes a central stabilizing mass 20 (i.e., housing 120, 220, 320, 420 or speaker sub-housing 28). Vibration associated with actuation of the subwoofer 36 to produce sound is isolated from the stabilizing mass 20 by a damper linkage system 54. In turn, vibration of the stabilizing mass 20 is isolated from the vibration sensitive projector 22 by a second damper linkage system 52. The mass of the projector 22 acts as a secondary mass such that the natural frequency of the spring-mass system that it forms with the spring has a low natural frequency. The intent is to place the natural vibration frequency of the system outside of the range of frequencies generated by the audio component 32/34/36. This design prevents vibration from the audio system 32/34/36 from being coupled through the stabilizing mass 20 to the projector 22. It keeps audio vibrations from being manifested as movement of the projected image which would be an annoyance during viewing. Similarly, a third spring mass damper system 52, similar to the second, is employed to isolate the media player component 27 from vibrations of the stabilizing mass 20. Thus, the vibration dampening and suppression system 50 couples the speaker 36 to the mass 20 (i.e., housing 120, 220, 320, 420 or speaker sub-housing 28) for minimizing speaker audio distortion and for reducing vibration impact on the other devices such as the projector 22 and/or the media player 27.

Figure 11:
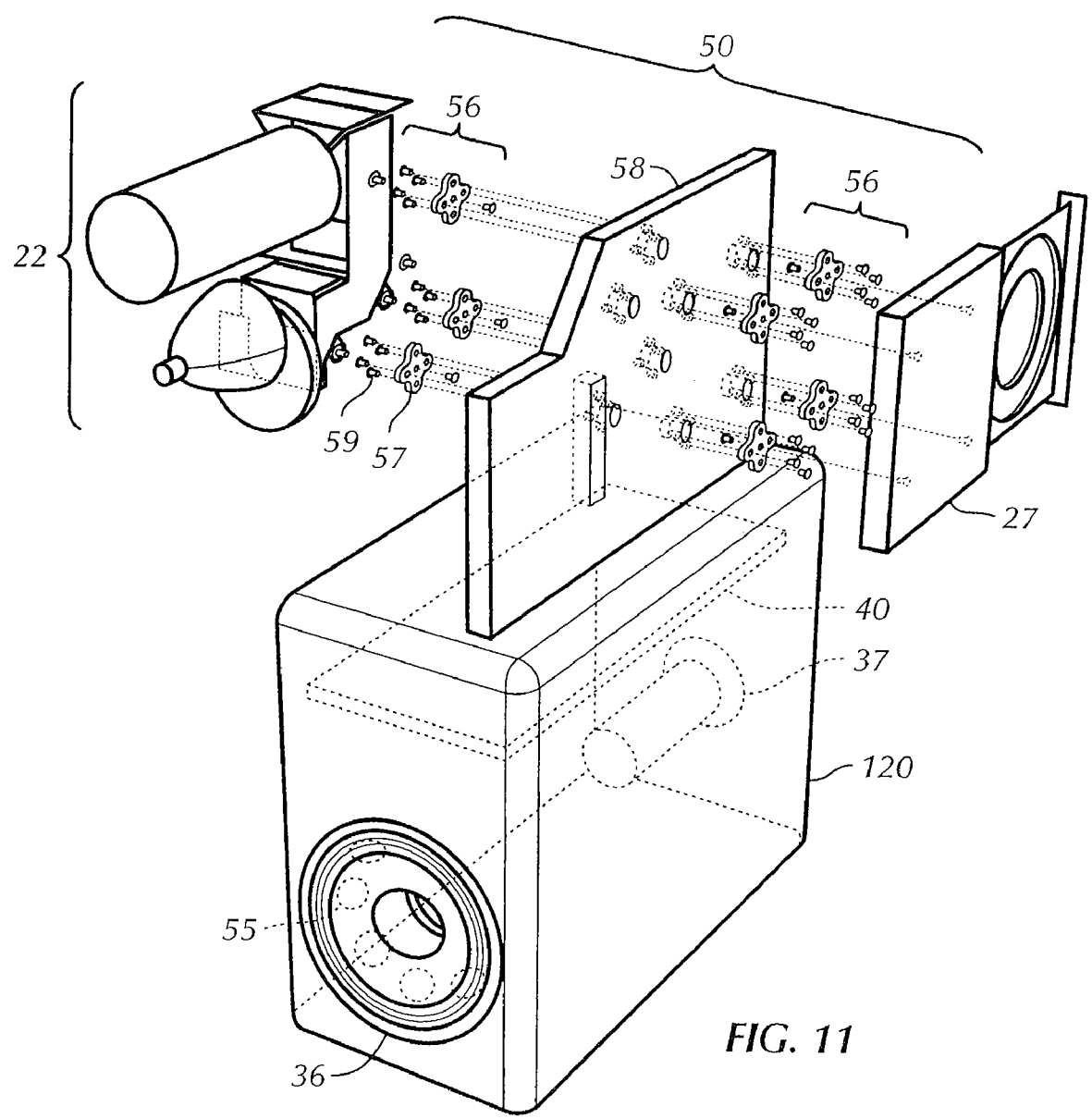
FIG. 11 is an exploded perspective view of the major components for the multimedia projection system of FIGS. 1-3 along with a vibration dampening and suppression system.

FIG. 11 shows one possible physical configuration of a vibration dampening system 50 for coupling the speaker to the housing 120, 220, 320, 420 or a speaker sub-housing 28 (which acts as a stabilizing mass), the projector 22 to the chassis 58 and the media player 27 to the chassis 58. As shown, the chassis 58 is represented as a mounting plate or shelf, but the chassis 58 may also be a rack design similar to a personal computer chassis. The vibration dampening system includes a plurality of dampening assemblies 55, 56. Each dampening assembly 55, 56 includes an elastic support or grommet 57 and mounting screws 59 for securing the projector 22, media player 27 and/or speakers 32/34 and subwoofer 36 to one or more of the chassis 58, the housing 120, 220, 320, 420, a shelf 221, 321, or, in the case of the speakers and subwoofer 32/34/36, to the speaker sub-housing 28. The availability of polymeric elastic materials having both spring like behavior and plastic strain for energy absorptive behavior is employed to form the vibration dampening system 50. The elastic supports 57 are at least partially formed of rubber or polymeric elastic material. It is contemplated that a metal or rigid polymeric plate may be covered or coated with a more elastic material to accomplish the intended goal of vibration dampening and system decoupling. The material is preferably Kynar® commercially available from Atofina Chemicals, Inc., Philadelphia, Pa. However, other suitable elastic polymers that have elastic energy absorptive properties can be used as the elastic supports 57 and thereby provide the vibration isolation required. The vibration dampening system 50 includes energy absorptive spring like material that couples the projector 22 and media player 27 to the mounting plate or chassis 58 (i.e., the stabilizing mass) such that each will be free to move, even if slightly, relative to the mounting plate or chassis 58 by flexure of the spring-like elastic support 57.

Alternatively or in combination, as shown in FIG. 10 by schematic representation, metal springs S can also be employed in the vibrational damper system 50, 60. Springs S are not as likely to lose structural memory under load conditions as rubber or polymers. An ideal combination would be a metal spring S with a polymeric coating. The spring S provided the desired elastic qualities while the polymeric coating provides the desired energy absorption/dampening qualities. The spring S may be configured as a coil, as a linear shaped bar or as some other shaped structural member.

FIG. 12A-12B show another possible configuration for the assembled vibration dampening system 60 for coupling the speaker to the housing 120, 220, 320, 420 or a speaker sub-housing 28 (which acts as a stabilizing mass), the projector 22 to the chassis 68 and the media player 27 to the chassis 68. The vibration dampening system 60 includes a trapping bracket 66, an elastic mounting support 62, a mounting plate 61 and securement hardware 69, 69a such as screws or bolts 69 and/or nuts 69a. The chassis 68 represents the body or chassis of the various sub-units 22, 27, 32/34/36, 70. The elastic mounting support 62 is mounted to an opening or open area on the mounting plate 61. The mounting plate 61 may be a shelf like 221, 321 or an internal plate or frame like 58 above. It is envisioned that each sub-unit 22, 27, 32/34/36, 70 has at least a structural frame itself, if not its own sub-enclosure, so the respective chassis 68 for each sub-unit 22, 27, 32/34/36, 70 is trapped to the elastic mounting support 62 by the trapping bracket 66 to constrain the movement of the chassis 68 so as to remain within fixed limits defined for the mounting plate 61 between the respective chassis 68 and the trapping bracket 66.

Other similar vibration dampening systems 50, 60 can be implemented utilizing other shapes and sizes of an elastic mounting support 57, 62 that is coupled between each sub-unit 22, 27, 32/34/36, 70 and the housing 120, 220, 320, 420 or the associated internal structural framework of the housing 120, 220, 320, 420. Likewise a similar goal may be achieved by using elastic washers on either side of a bolt 69 and 69a or between the head of a screw 59 and the sub-unit 22, 27, 32/34/36, 70 and between the sub-unit 22, 27, 32/34/36, 70 and the mounting plate or shelf 58, 61 to accomplish a similar result.

Although the inclusion of the vibrational damper system 50, 60 will not only make the portable multimedia projection system 100, 200, 300, 400 more distinctive in appearance, but the vibrational damper system 50, 60 will make the portable multimedia projection system 100, 200, 300, 400 more efficient in operation and will provide a higher quality projection and audio output.

Figure 15:
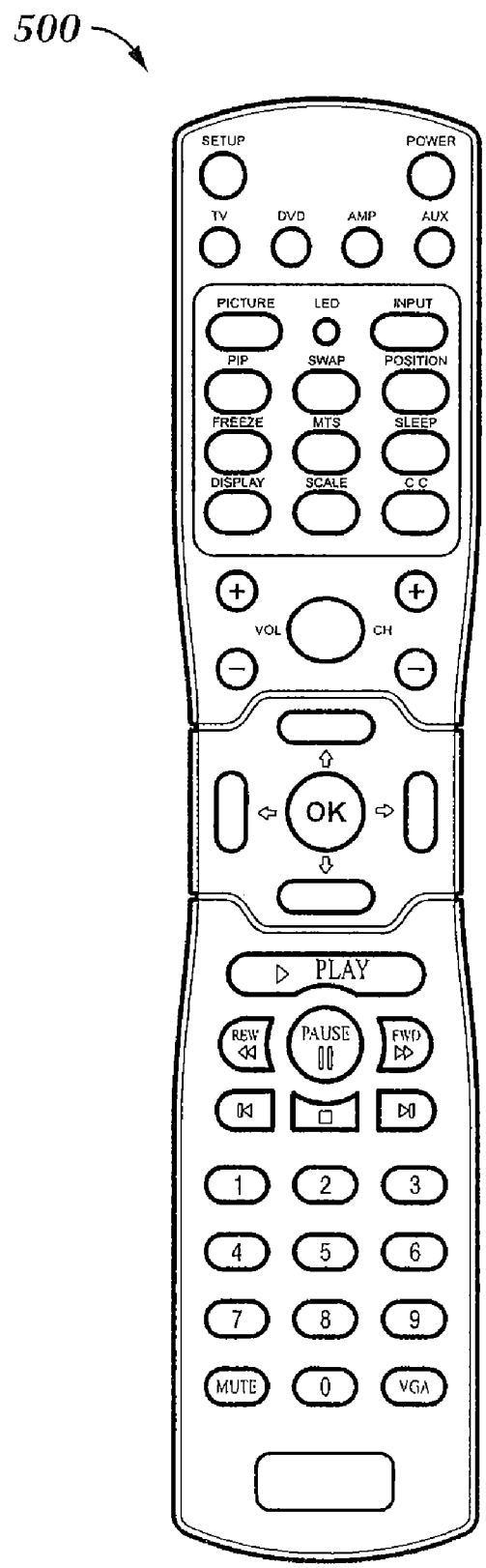
FIG. 15 is a top plan view of a remote control for use with the preferred embodiments of the present invention.

Due to differences among all sub-units 22, 27, 32/34/36, 70, one integration technique is to use a bridging control board PCB (FIGS. 5 and 7-9) to connect all sub-units 22, 27, 32/34/36, 70 for globally controlling them in concert. On such a bridging control board PCB there are switching components (AV Switch) and a controller MCU to manipulate controls over switching input signals from different sources as well as transceiving commands of integration, switching and adjustment via remote control 500 (FIG. 15).

Figure 7:
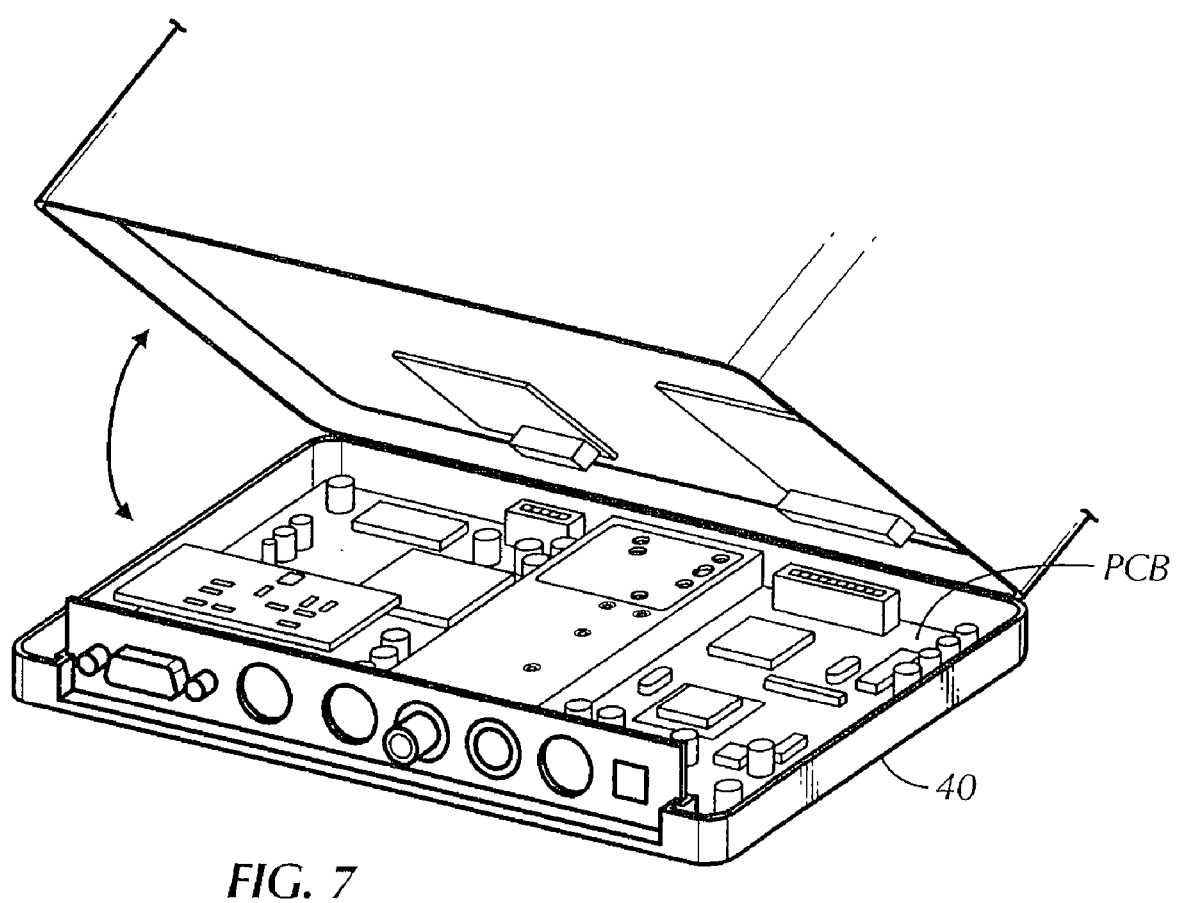
FIG. 7 is a perspective view of an electronics chassis in accordance with the preferred embodiments of the present invention.
Figure 8:
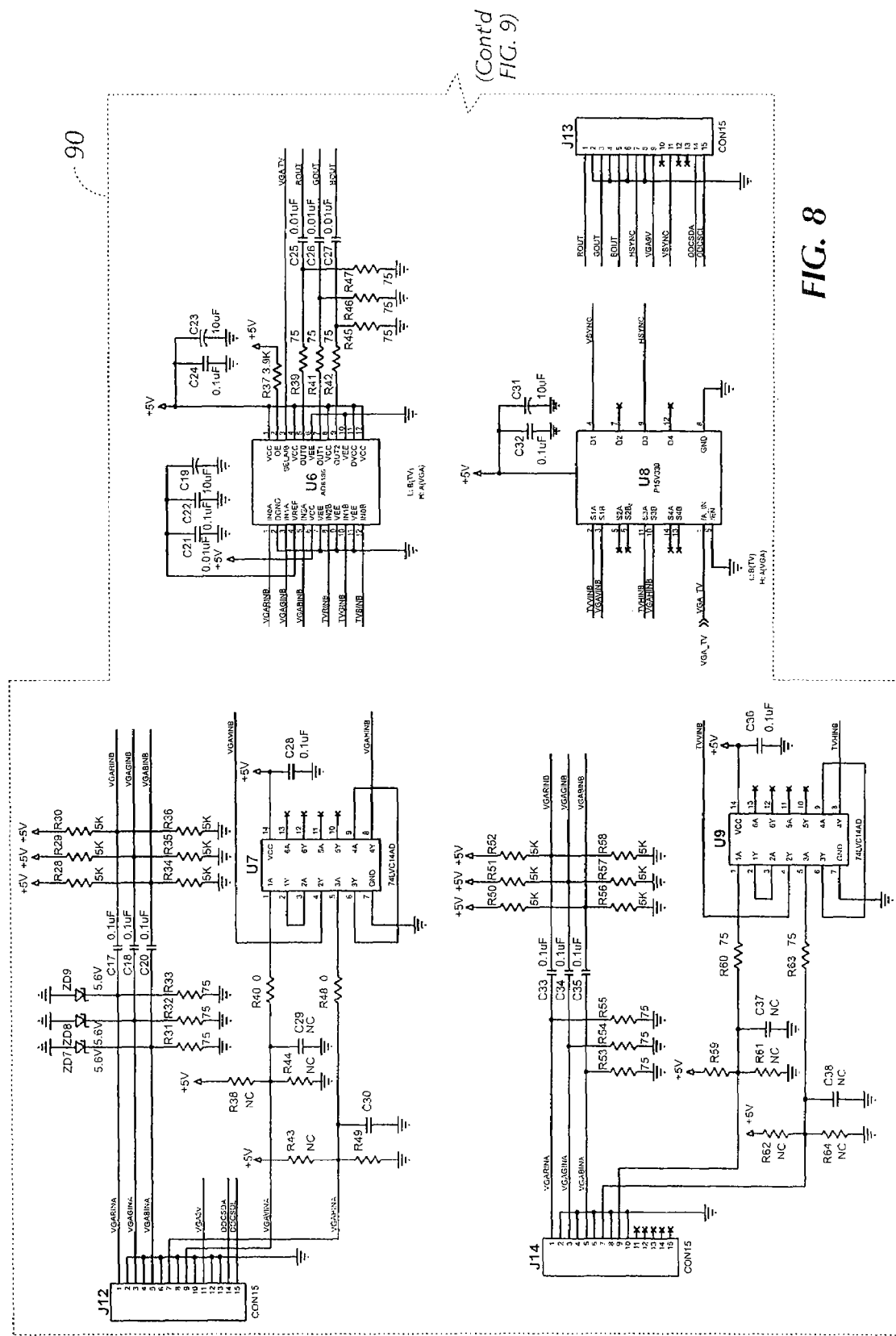
FIGS. 8-9 are electrical schematics of control circuitry for a multimedia projection system in accordance with the preferred embodiments of the present invention.
Figure 9:
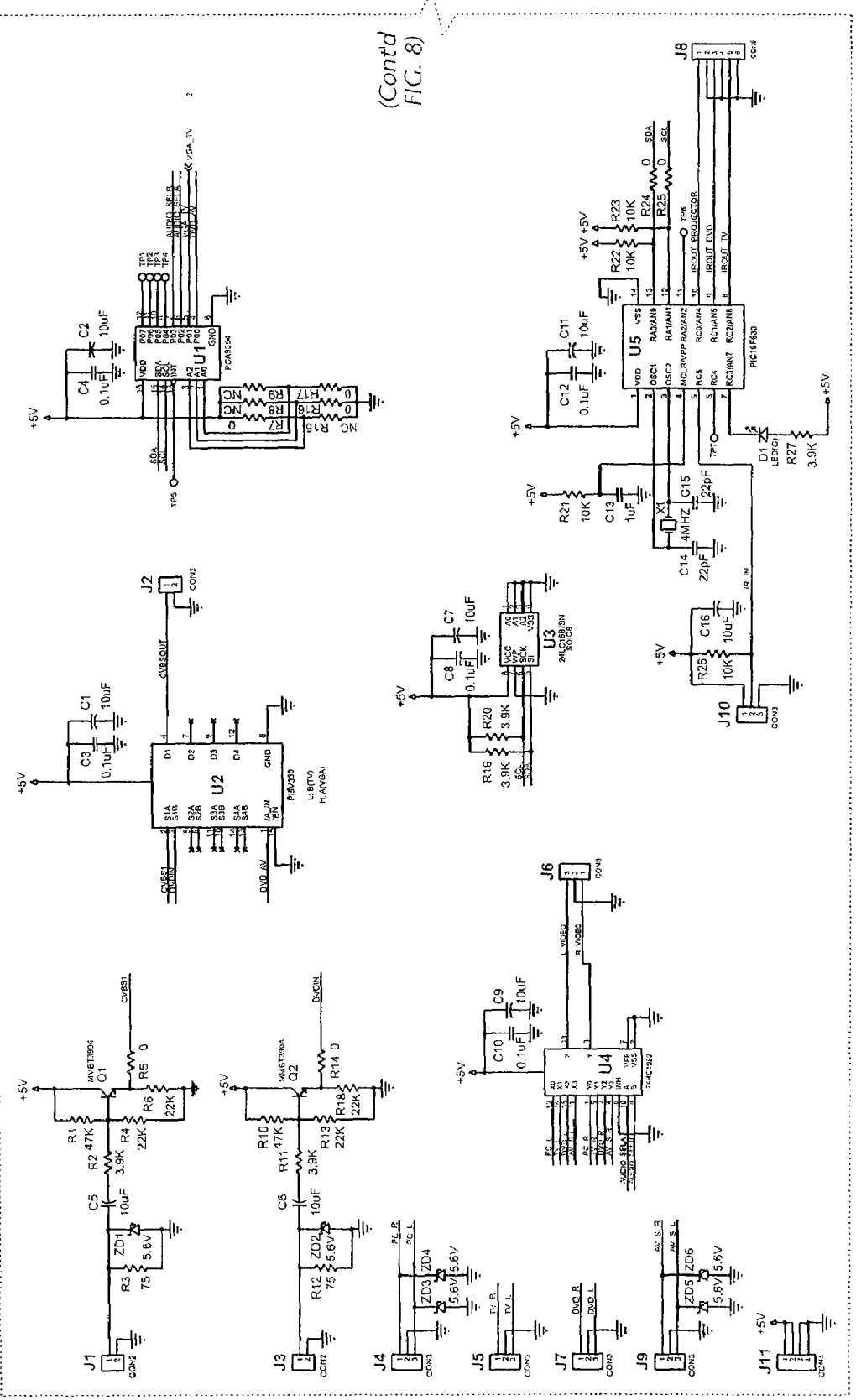

FIGS. 8-9 are electrical schematics of control circuit 90 for a multimedia projection system 100, 200, 300, 400 in accordance with the present invention. FIG. 7 is a perspective view of an electronics chassis for housing a circuit board or boards PCB which encompass the control circuit or bridge circuit 90.

Referring to FIGS. 8-9 in detail, the bridge circuit receives input audio signals J4, J5, J7, J9. The audio signals according to different sources are connected to standard 3-pin audio connectors, of which pin #1 is designated for right-side audio signal and pin #3 for left-side audio signal, while pin #2 being ground. The audio signals from TV/radio channel tuner 70 and media player 27 are directly connected to the 3-pin connector, then output signals to Audio Switch U4. The audio signals from PC or AV are connected to the 3-pin connector, and then output via a filter circuits. The bridge circuit 90 also includes a video switch U2 which as shown is a 16-pin integrated circuit (IC) such as a PI5V330 with pin #1 connected with DVD_AV input, pin #2 connected with CVBS1 input, pin #3 connected with DVDIN input, pin #5~7, 9~14 not connected, pin #8 and #15 being ground, pin #4 connected to the pin #1 of 2-pin Connector J2 for CBVSOUT output, and pin #16 connected to a +5V power circuit. The bridge circuit 90 also includes audio switch U4 which as shown is a 16-pin IC such as a 74HC4052 with pin #1 connected with PC_R input, pin #2 connected with DVD_R input, pin #4 connected with AV_S_R input, pin #5 connected with TV_R input, pin #11 connected with AV_S_L input, pin #12 connected with PC_L input, pin #14 connected with TV_L input, pin #15 connected with DVD_L input, pin #6~8 being ground, pin #9 and #10 connected with AUDIO_SELA and AUDIO_SELB inputs, pin #3 and #13 connected R_VIDEO and L_VIDEO outputs each to pin #1 and pin #3 a 3-pin connector by ground its pin #2. The bridge circuit 90 also includes an RGB switch U6 which as shown is a 24-pin IC such as an AD8186 with pin #1, #3, #5 each connected with VGA's R/G/B inputs, pin #2, #7, #9, #11, #15, #19 being ground, pin #4 connected to a filter circuit, pin #6 connected to +5V power, pin #8, #10, #12 each connected with TV's R/G/B inputs, pin #13, #14, #21, #24 connected to a +5V filter circuit, pin #16, #18, #20 connected via regulating circuit each to R/G/B outputs, pin #22 connected to VGA_TV output, and pin #23 connected to a +5V power amplifying circuit. The bridge circuit 90 also includes a sync switch U8 is a 16-pin IC such as PI5V330, similar to video switch U2, with pin #1 for VGA_TV in, pin #2 and #11 for TV's vertical and horizontal signals input, pin #3 and #10 for VGA's vertical and horizontal signals input, pin #5~7, #12~14 not connected, pin #8 and #15 being ground, pin #4 and #9 for vertical and horizontal signals output of the Sync, and pin #16 connected to a +5V power regulating circuit. The bridge circuit 90 also includes a GPIO expansion U1 which as shown is a 16-pin IC such as a PCA9554 with pin #1~3 and #16 connected with a +5V power circuit, pin #4~7 each connected with input from DVD_AV, VGA_TV, AUDIO_SELA and AUDIO_SELB, pin #8 being ground, pin #9~13 connected to TP 1~5 of the Projector sub-units, and pin #14 and #15 connected each to SCL and SDA. The bridge circuit 90 also includes an electronically erasable programmable read only memory (EEPROM) U3 which as shown is an 8-pin IC such as a 24LC12B/SN with pin #1~4 and #7 being ground, pin #5 and #6 each connected via an amplifying circuit to SCL and SDA, pin #8 connected to a +5V power circuit.

The bridge circuit 90 also includes a MCU U5 which as shown is a 14-pin IC such as a PIC16F630 with pin #1 connected to a +5V power circuit, pin #2 and #3 connected to an oscillator circuit, pin #4 connected to another +5V power circuit, pin #5 connected via an IR transceiver circuit to pin #2 of the 3-pin connector J10 while its pin #1 linked with a +5V power circuit and Pin #3 ground, pin #6 and #11 connected to TP6 and TP7 of the Projector sub-unit, pin #7 connected to a +5V driven LED, pin #8~10 each connected to pin #5, #3, #1 of a 6-pin connector J8, of which other 3 pins ground, for transceiving IR signals output of TV, DVD and Projector, pin #12 and #13 connected with SCL and SDA, and pin #14 being ground. The MCU U5 is the core of the bridging circuit 90 and selectively controls and coordinates all of the AV switches and associated circuitry based upon user commands from a control panel 24, 25, 80 and/or remote control 500. The MCU U5 is preferably a microcontroller, but the MCU U5 may be a microprocessor, application specific integrated circuit (ASIC), a dedicated AV control IC and the like without departing from the invention.

The bridge circuit 90 also includes a VGA Switch U7 and TV Switch U9 which are each as shown a 14-pin IC such as a 74LVC14AD, and are linked with 15-pin connectors J11 and J13. VGA and TV input signals are connected via the amplifying circuits to pin #1, #3, #5 of the connector J11 and J13. Pin #2, #4, #6, #8, #10, #12, #13 of J11 is ground, while pin #2, #4, #6, #8, #10 of J13 is ground. Pin #7, #9, #11 of J11 are connected each to VGA's vertical and horizontal A signals as well as VGA9V. Pin #14 and #15 of J11 are connected to DDCSDA and DDCSCL. Pin #11~15 of J13 are not connected, while pin #7 and #9 of J13 are connected each to TV's vertical and horizontal A signals. All these vertical and horizontal A signals are connected via the amplifying circuit to pin #1 and pin #5 of the U7 and U9, while those vertical and horizontal B input signals are connected to the pin #4 and pin #8 of U7 and U9. Pin #2 and pin #3 of these switches are interconnected, and so are pin #6 and pin #9 of them. Pin #7 of the switches are ground, while pin #10~13 of them are not connected. Pin #14 of the switches U7, U9 are connected to a +5V power circuit.

By way of explanation, the selective controls of the bridge circuit 90 can occur as follows. Taking VGA for example, when MCU U5 receives an instruction to switch onto VGA, it will send out a command to IC U6 for switching route to VGA signal, then switching audio signal route for VGA, and finally commanding the projector sub-unit 22 to display in the VGA mode while outputting stereo sounds (or mono sounds depending on the source) to the 2.1 channel amplified sound system 32/34/36. As for TV, when MCU U5 receives an instruction to switch onto TV, it will send out a command to IC U8 for switching route to TV signal, then switching audio signal route for TV, and finally commanding the projector sub-unit 22 to display in the TV mode while outputting stereo sounds to the 2.1 channel amplified sound system 32/34/36. Taking DVD for example, when MCU U5 receives an instruction to switch onto DVD, it will send out a command to IC U2 for switching route to DVD signal, then switching audio signal route for DVD, and finally commanding the projector sub-unit 22 to display in the DVD mode while outputting stereo sounds to the 2.1 channel amplified sound system 32/34/36. As for VIDEO, when MCU U5 receives an instruction to switch onto VIDEO, it will send out a command to IC U2 for switching route to VIDEO signal, then switching audio signal route for VIDEO, and finally commanding the projector sub-unit 22 to display in the VIDEO mode while outputting stereo sounds to the 2.1 channel amplified sound system 32/34/36. Taking S-VIDEO for example, MCU U5 directly commands the projector sub-unit 22 to display in the S-VIDEO mode, and finally switching audio signal route for S-VIDEO while outputting stereo sounds to the 2.1 channel amplified sound system 32/34/36. Similar switching techniques can be implemented for component video, computer input, network input and the like. Likewise, other circuit components and detailed circuit implementations can achieve the same result without departing from the invention.

Thus, the schematic design for the bridge circuit 90 of the portable multimedia projection system 100, 200, 300, 400 is provided so that the bridging control board PCB can process video and audio signals, then output video and audio signals to the projector unit 22 as well as the 2.1 channel amplified sound system 32/34/36 having speakers 32, 34 with subwoofer 36.

As shown, the bridge circuit 90 functions as a master control board PCB for controlling the circuits (not shown in detail) of the various sub-units 22, 27, 32/34/36, 70. However, the bridge circuit 90 may alternatively be implemented as the entire circuit for all of the sub-units units 22, 27, 32/34/36, 70 and the MCU U5 with various AV switches and inputs for the portable multi-media projection system 100, 200, 300, 400 without departing from the present invention.

Figure 14A:
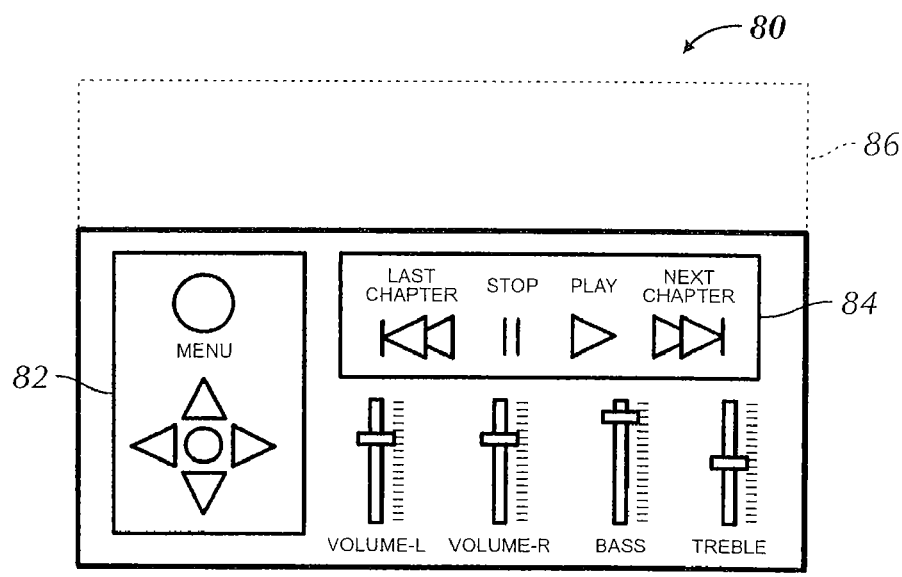
FIG. 14A is a top plan view of a local control panel for use with the preferred embodiments of the present invention.

FIG. 14A is a top plan view of another local control panel 80 for use with a multimedia projection system 100, 200, 300, 400 in accordance with the present invention. The control panel 80 includes volume control buttons for left and right as well as level settings for bass and treble. The control panel 80 also includes quick keys 84 for multimedia play control such as buttons for last (chapter), next (chapter), stop, and play. Additionally, the control panel 80 includes a soft button panel 82 with a menu button and buttons for up, down, left, right and select or enter. The control panel 80 may be implemented as physical buttons, sliders and switches. Optionally, the control panel 80 includes an LCD display 86. Alternatively, the control panel 80 may be a miniature touchscreen, like a personal digital assistant (PDA) and the like. Alternatively, the control panel 80 may be even more simplified or more complex. It is contemplated that the control panel 80 includes a complete equalizer control panel for a full range of audio control (i.e., treble, mid-range, bass) with a plurality of frequency settings, level settings and the like.

FIG. 15 is a top plan view of a remote control 500 for use with a multimedia projection system 100, 200, 300, 400 in accordance with the present invention. The remote control 500 transmits a wireless signal such as an infrared (IR), radiofrequency (RF), Bluetooth and the like. Bluetooth is a radiofrequency technology commercially available from members of the Bluetooth Special Interest Group (SIG) trade association, Washington District of Columbia (D.C.). The remote control 500 includes the following buttons: power, setup, TV, DVD, lap, aux, picture, input, PIP swap, position, freeze, MTS, sleep, display, scale, CG, +(channel), −(channel), +(volume), −(volume), menu, up, down, left, right, play, pause, rev, fwd, "|<", record, ">|", 1, 2, 3, 4, 5, 6, 7, 8, 9, 0, mute and VGA. The remote control 500 may include fewer buttons or more buttons. The remote control 500 can preferably control all of the functions of the local control panel 24, 25, 80 and even more. The remote control 500 can control the features of the projector 22 such as zoom, rotation sync, vertical, horizontal, scaling, color settings, brightness, contrast and the like. The remote control 500 can control all of the features of the media player 27 such as fast forward, rewind, select menu, play, pause, zoom (digital), next chapter, last chapter and the like. The remote control 500 can control all of the features of the 2.1 channel sound system 32/34/36 such as volume up and down as well as setting levels visa vie an onscreen menu. The remote control 500 can control all of the features of the TV/radio channel tuner 70 such as up and down channels, direct channel selection and the like. The remote control 500 can also control other overall settings and the like.

Alternatively, the remote control 500 may be implemented as a miniature touchscreen, like a personal digital assistant (PDA), a cellular telephone and the like.

Alternatively, the remote control 500 may be implemented by a software program for a conventional PDA that has wireless transmit capabilities such as IR, Bluetooth, RF and the like.

Figure 14B:
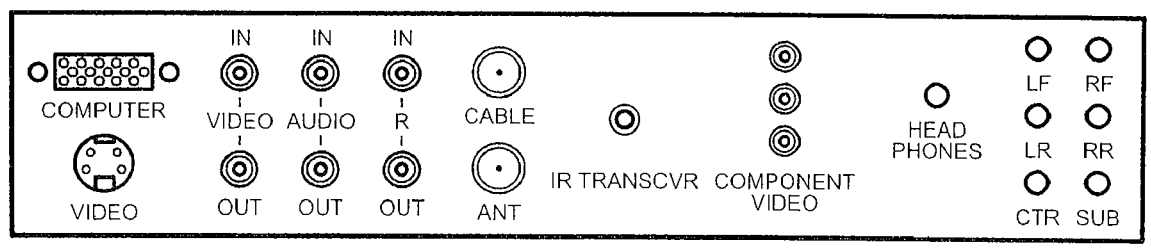
FIG. 14B is a top plan view of a connection interface panel for use with the preferred embodiments of the present invention.

FIG. 14B is a top plan view of a connection interface panel for use with a multimedia projection system 100, 200, 300, 400 in accordance with the present invention. The connection interface panel has a plurality of connectivity options including component video, Ethernet, wireless data I/O (e.g., WiFi), radio frequency (RF) receiving for radio and television, S-video, cable, parallel, serial, universal serial bus (USB), phono jack (headphones), and multi-channel outputs. The controller MCU U5 is electrically coupled to the connectivity I/O to communicate and/or to selectively direct audio signals to the sound system 32/34/36 and video signals to the image projection device or projector 22 based upon data received from the connectivity I/O, in lieu of data from the media player, upon user selection The portable multimedia projection systems 100, 200, 300, 400 may all be configured with internal data compression encoding and decoding for playing files in compressed format such as WAV, WMA, MP3, MP3PRO, MPEG, MPEG-2, RA, RA-G2 and the like.

The portable multimedia projection systems 100, 200, 300, 400 also include the necessary decryption software for playing licensed and copyrighted multimedia files from commercially available media such as that required to decrypt movies from DVDs as recommended by the DVD Copy Control Association.

The portable multimedia projection systems 100, 200, 300, 400 are configured to have firmware updates by network download or from a file on a CD-ROM, DVD, Flash-memory card and the like. Such firmware updates may include new decryption software/software licenses, updated decompression software, enhanced control features, additions of new file formats and the like. Preferably, the portable multimedia projection systems 100, 200, 300, 400 can connect directly to an update server by connecting to an internet capable network.

In addition to the vibration isolation described above, some method of acoustic isolation may also be implemented to reduce noise (from the output of the speakers 32/34/36) and electromagnetic interference from the drive magnets in the speakers 32/34/36 since this may also adversely affect some of the other components 22, 27, 70 in the same way the electromagnets might affect the CRT guns in a typical TV/PC monitor. Such shielding (not shown clearly) will most likely consist of a thin layer of metal around the speakers 32/34/36 embedded in or covering the walls of the speaker enclosure 28.

Optionally, the housing 120, 220, 320, 420 may include a handle of some sort to carry the unit around or a carrying case with a handle.

Optionally, the portable multimedia projection systems 100, 200, 300, 400 are configured to be mounted on a conventional tri-pod (i.e., a camera or video tri-pod).

Optionally, the portable multimedia projection systems 100, 200, 300, 400 include a connection for graphic and video intensive video game system such as an XBox® commercially available from Microsoft Corporation, Redmond, Wash.

Thus, there are a lot of features embedded into the portable multimedia projection system 100, 200, 300, 400 that are typically separate devices. This is a big advantage for the portable multimedia projection system 100, 200, 300, 400 because, as yet, no one has integrated all of the devices together into a multimedia system with amplified home-theater quality sound. In addition, no one has yet integrated a theater/home-theater quality sound system 32/34/36 with a projector and media player 22, 27 in the same enclosure or housing 120, 220, 320, 420. Also the portable multimedia projection system 100, 200, 300, 400 is much smaller than the typical big screen TV, projection TV, and/or home theater system. Therefore, the portable multimedia projection system 100, 200, 300, 400 provides a degree of portability that does not currently exist with any other unit allowing the portable multimedia projection system 100, 200, 300, 400 to be moved from room to room, or even play movies outside on the side of the house or at the pool and the like. It also allows for a large display area (i.e., on an interior or exterior wall or on a projector screen). Adding the theater/home-theater quality sound system 32/34/36 also allows an additional dimension for presentations so that computer slide-show presentations are no longer constrained to just words and still pictures, but animation and music can now be added to business and non-business presentations alike. Music videos can also now be shown at parties or in bars and nightclubs in much the same way as DJs play music. Kiosks can now be set up to display motion pictures on a larger area than might have previously been used with typical TV/PC monitors at conventions/exhibitions. Many additional options for presentations/displays are now created with this portable multimedia projection system 100, 200, 300, 400. Likewise, video games and the like may be played or viewed by large groups of players and/or viewers making tournaments much more interesting.

From the foregoing, it can be seen that the present invention comprises a portable multimedia projection system having a vibration dampening or suppression device. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A portable multimedia projection system comprising:
  a portable housing;
  a digital video disc/digital versatile disc (DVD) player supported by the portable housing, the DVD player outputting audio visual data signals corresponding to data read from a DVD;
  a digital projector disposed at least partially within the housing, the digital projector externally projecting images relative to the portable housing, the projector being one of a liquid crystal display (LCD) and digital light processing (DLP);
  an amplified sound system being disposed at least partially within the housing, the amplified sound system including an output for at least one of a 2.1 channel sound system, a 5.1 channel sound system, a 6.1 channel sound system and a 7.1 channel sound system; and a controller disposed within the housing, the controller being electrically coupled to the DVD player, the amplified sound system and the digital projector, the controller directing audio signals from the DVD player to the amplified sound system and directing video signals from the DVD player to the digital projector.

2. A portable multimedia projection system comprising:

a portable housing;

a channel tuner supported by the portable housing;

a digital projector disposed at least partially within the housing, the digital projector externally projecting images relative to the portable housing, the projector being one of a liquid crystal display (LCD) and digital light processing (DLP);

an amplified sound system being disposed at least partially within the housing, the amplified sound system including an output for at least one of a 2.1 channel sound system, a 5.1 channel sound system, a 6.1 channel sound system, and a 7.1 channel sound system; and a controller disposed within the housing, the controller being electrically coupled to the channel tuner, the amplified sound system and the digital projector, the controller directing audio signals from the channel tuner to the amplified sound system and directing video signals from the channel tuner to the digital projector.

3. A portable multimedia projection system comprising:

a portable housing;

a media player supported by the portable housing;

an amplified sound system disposed at least partially within the housing, the sound system having at least one internally-mounted speaker relative to the portable housing, the sound system comprising one of a 2.1 channel sound system, a 5.1 channel sound system, a 6.1 channel sound system and a 7.1 channel sound system;

an image projection device disposed at least partially within the housing, the image projection device externally projecting images relative to the portable housing;

a controller disposed within the housing, the controller being electrically coupled to the media player, the sound system and the image projection device, the controller directing audio signals from the media player to the sound system and directing video signals from the media player to the image projection device; and a remote control receiver disposed at least partially within the housing, the remote control receiver in electrical communication with at least one of the media player and the controller.

4. A portable multimedia projection system comprising:

a portable housing;

a channel tuner supported by the portable housing;

an image projection device disposed at least partially within the housing, the image projection device externally projecting images relative to the portable housing;

a controller disposed within the housing, the controller being electrically coupled to the channel tuner and the image projection device, the controller directing video signals from the channel tuner to the image projection device;

a remote control receiver disposed at least partially within the housing, the remote control receiver in electrical communication with at least one of the channel tuner and the controller; and an amplified multi-channel sound system disposed at least partially within the housing, the sound system having at least one internally-mounted subwoofer speaker relative to the portable housing and comprising one of a 2.1 channel sound system, a 5.1 channel sound system, a 6.1 channel sound system and a 7.1 channel sound system, the controller directing audio signals from the channel tuner to the sound system.

\* \* \* \* \*